3,022,750
LADING COVER FOR TRANSPORT VEHICLE
Wilbert G. Nichol, Pittsburgh, Pa., assignor to United States Steel Corporation, a corporation of New Jersey
Filed May 23, 1960, Ser. No. 30,892
2 Claims. (Cl. 105—377)

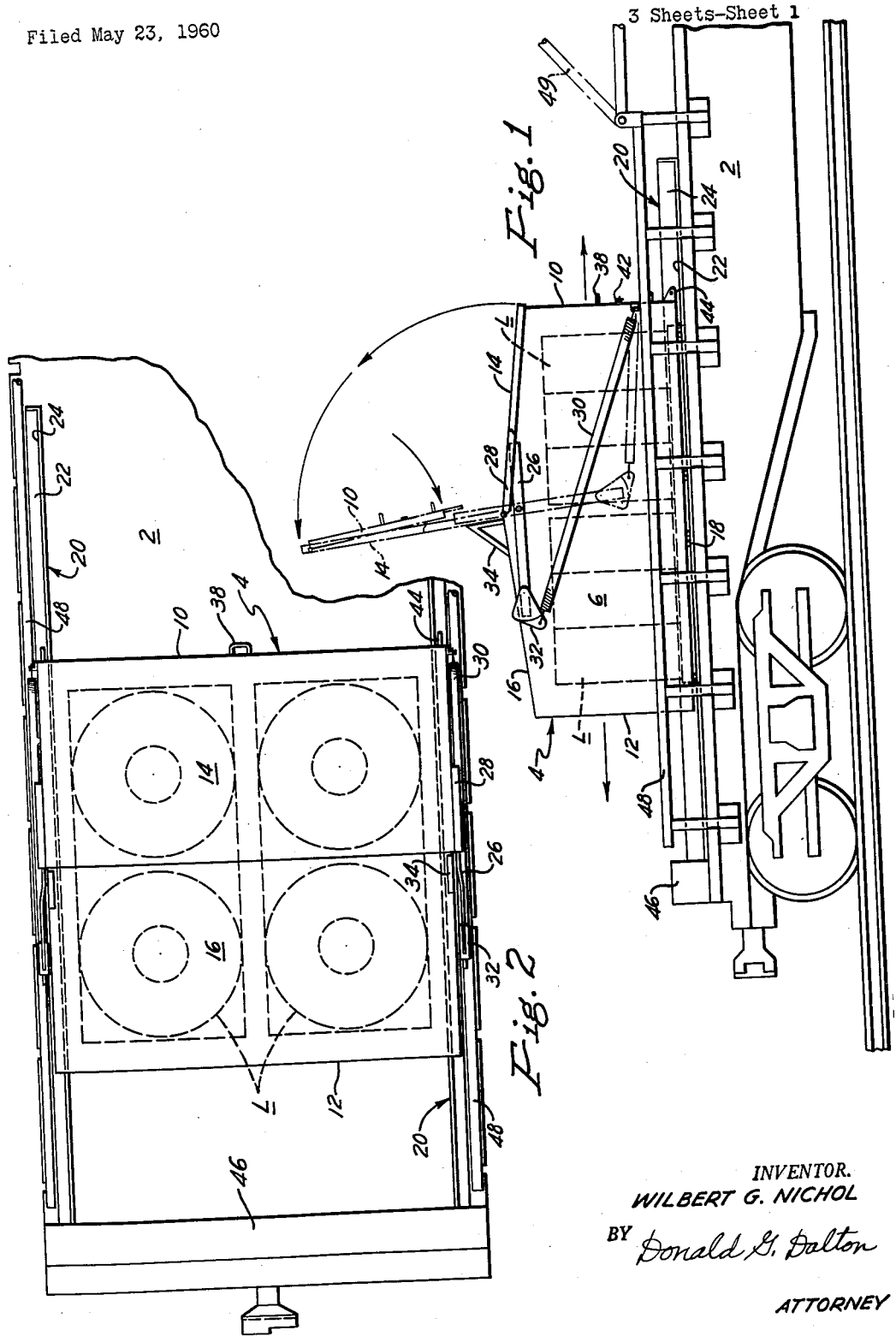

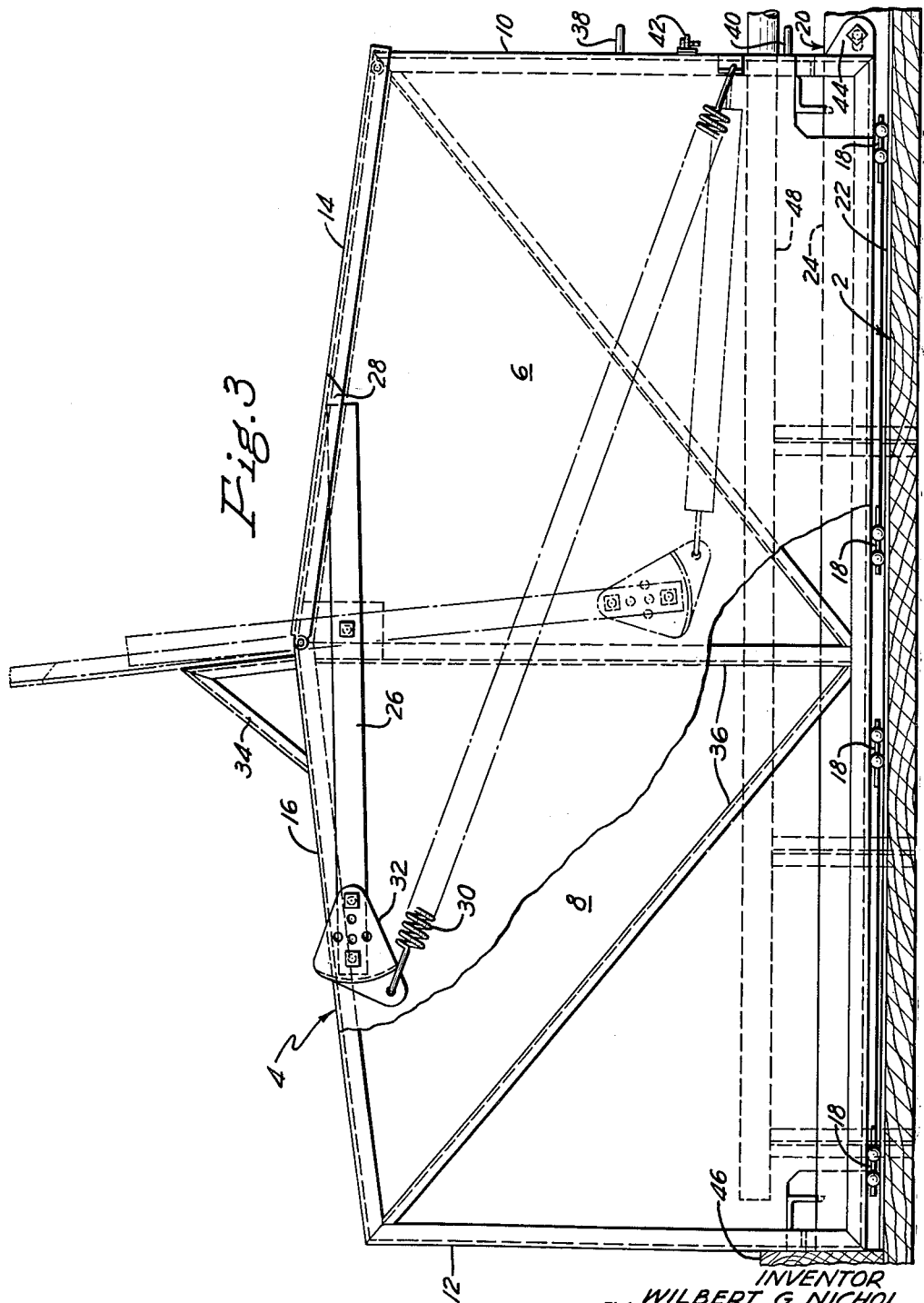

The present invention relates generally to apparatus for transporting material and more particularly to a lading cover especially suitable for protecting goods being shipped in transport vehicles such as railroad flat cars, gondola cars, open top highway trucks, highway truck trailers and the like.

Prior to my invention, the lading covers used to protect goods, such as coiled steel strip, being shipped on transport vehicles such as railroad flat cars were relatively cumbersome, heavy box-like structures formed with permanently joined top and side sections. In order to load or unload goods protected with such a cover it was necessary to manipulate it with an overhead crane or a fork-tractor equipped with a special fork extension to place it on or remove it from the load of goods. No matter which means was used to handle the cover, the operation was difficult and time consuming. Also, with either the crane or the fork-tractor, temporary storage of the cover while the goods were being loaded or unloaded frequently presented a problem, particularly where trackside loading platform facilities were limited or non-existent. The handling difficulties with a fork-tractor were accentuated by limited visibility and restricted maneuvering space on the flat car deck.

It is, accordingly, an object of my invention to provide a lading cover for a transport vehicle which is lightweight in construction and is provided with a hinged end and roof portion which can be easily opened and closed by a single workman to provide access to the load under the cover.

It is another object of my invention to provide a lading cover in accordance with the above object wherein the hinged end and roof portion are counterbalanced by levers and tension springs.

It is another object of my invention to provide a lading cover as set forth in the above statements of object which is designed to remain on the load-bearing surface of the transport vehicle during loading and unloading.

It is a further object of my invention to provide a lading cover of the character set forth in the above objects which covers a load of goods in such a manner that the goods can be easily placed under the cover or removed therefrom by means of an overhead crane or a fork-tractor without removing the cover from the transport vehicle.

It is another object of my invention to provide a lading cover as set forth in the objects above which is designed to slide along spaced rails extending longitudinally of the load-bearing surface of a transport vehicle so that the lading cover can be used to cover controlled-movement loads and be movable with the loads.

These and other objects will become more apparent after referring to the following specification and attached drawings, in which:

FIGURE 1 is a side elevational view of one end of a railroad flat car equipped in accordance with my invention;

FIGURE 2 is a top plan view;

FIGURE 3 is an enlarged side elevational view of the lading cover of the invention.

Figure 4:
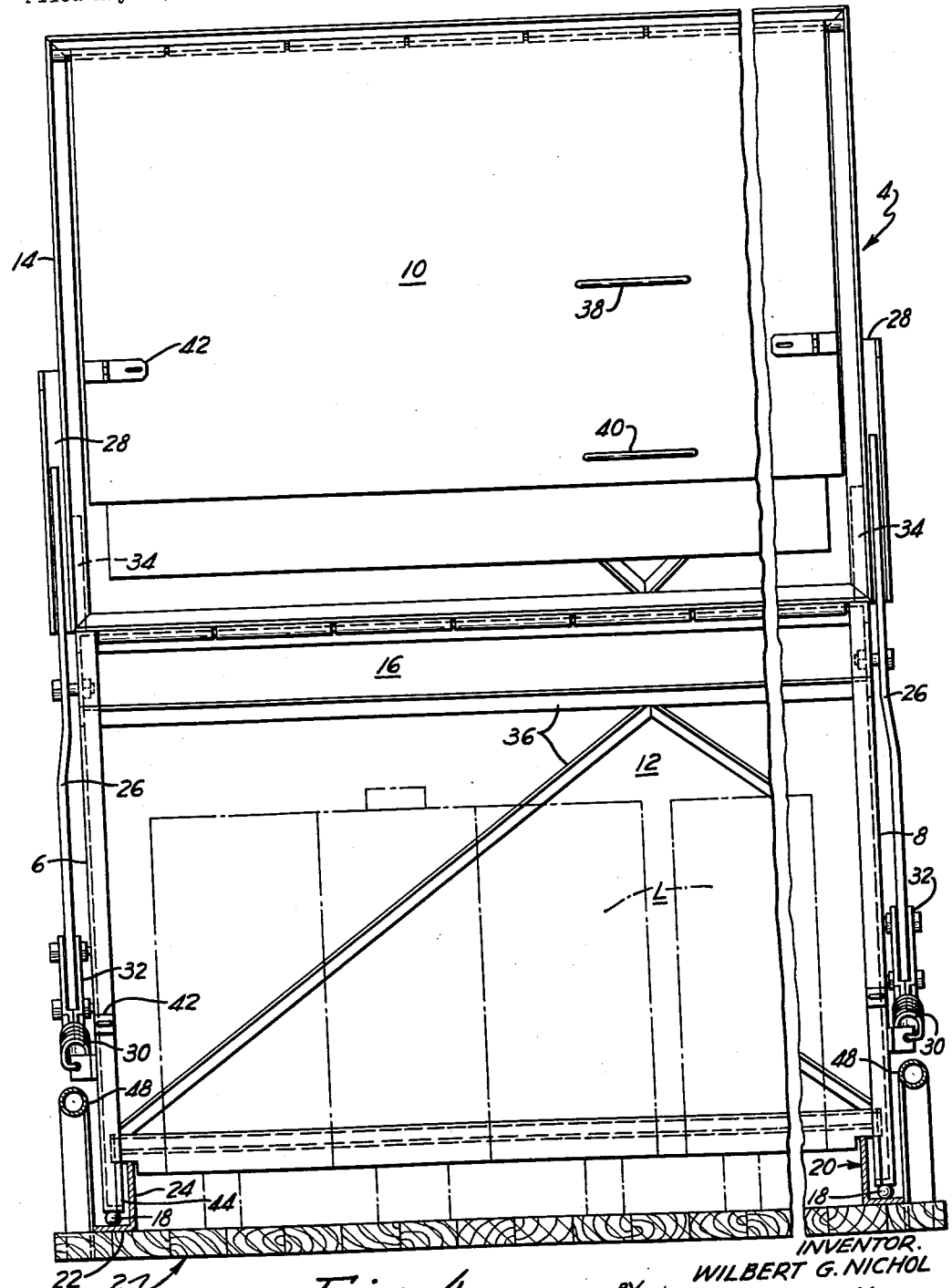
FIGURE 4 is a front elevational view showing the lading cover of the invention in open position.

Referring more particularly to the drawings reference numeral 2 designates one end portion of a railroad flat car having a lading cover 4 of the invention installed thereon.

The lading cover 4 is substantially rectangular in form having parallel side walls 6 and 8, parallel forward and rearward end walls 10 and 12, respectively, and a pitched roof comprised of a forward section 14 and rearward section 16. Ball bearing carriages 18 are attached to the bottom edges of the side walls 6 and 8 for supporting the cover for movement along spaced rails 20 which extend longitudinally from the end of the flat car deck to a point short of its center.

The rails 20 are in the form of angle bars having one leg 22 secured flatwise on the car deck with its free edge adjacent the side of the car and the other leg 24 projecting vertically from the floor of the car as best shown in FIGURE 4.

The side walls of the cover fit on the outside of the vertical legs 24 of the rails and the cover is movable longitudinally of the rails with the roller bearing carriages riding along the flatwise legs 22. Thus, the angles forming the rails 20 serve a twofold purpose—they provide a track for longitudinal travel of the cover and also serve as side guides for a controlled-movement load L under the cover.

The forward end wall 10 of the cover is hinged to the forward section 14 of the roof which in turn is hinged to the rearward roof section 16.

As best shown in FIGURES 1 and 3, a lever 26 is pivotally connected intermediate its ends to each of the side walls 6 and 8 immediately subjacent the pivot points of the forward roof section 14. One end portion of each of the levers 26 extends under an overhang portion 28 of each side of the forward roof section 14. A helical spring 30 is attached by one end to a clevis 32 which is adjustably mounted on the other end of each of the levers 26. The opposite end of each spring is fastened to the forward end of each of the side walls of the cover. The levers 26 and helical springs 30 function as counterbalances so that the roof section 14 and end wall 10 can be easily and quickly lifted with a minimum of lifting force.

Spaced stop members 34 project upwardly from the forward edge of the rearward section of the roof to provide a backstop for the forward roof section and hinged end wall when the cover is open as shown in FIGURES 1 and 3.

The side members, end members and roof sections of the cover are formed of relatively thin gauge sheet metal fabricated on a structural frame 36.

In operation, the cover is opened for loading by a workman grasping handles 38 and 40 affixed to the outer surface of the forward end wall and lifting the forward end wall 10 and the forward roof section 14. This causes the levers 26 and the forward roof section 14 to pivot to vertical position, and the hinged forward end wall 10 to rest against the raised forward roof section, as best shown by broken lines in FIGURES 1 and 3. In this position the forward roof section rests against the stop members 34.

After the load L, which may be in the form of palletized steel coils arranged in a controlled-movement load unit as described in my co-pending application Serial No. 850,615, now issued Patent No. 2,975,730, has been placed within the cover by means of a fork-lift tractor or a C-hook suspended from an overhead crane, the cover is closed by grasping handles 38 and 40 and pulling forward. This causes the levers 26 to be engaged by the overhangs 28 and be moved to horizontal position. As the forward roof section 14 and forward end wall 10 rotate to closed position spring 30 is stretched until maximum tension is reached when lever 26 is in horizontal position as shown by solid lines in FIGURE 1. When the cover is closed a hasp-and-pin 42 at each side of the forward end of the cover is used to secure the cover in closed position.

A lug 44 projects from the forward edge of each of the side walls of the cover and is used to bolt the cover to the vertical legs 24 of the rails 20, as best shown in FIGURE 3, when the flat car is being moved empty. This locking arrangement permits holding the cover firmly against the bulkhead 46 at the end of the car to avoid cover damage and safety hazards during transit while the car is empty.

A railing 48 having a removable center gate portion 49 may be provided along each side of the deck of the flat car to serve as a safety guard.

Although I have shown the cover of the invention installed on one end of a railroad flat car, it will be understood that the other end of the car may be likewise equipped. It will be further understood that the cover of the invention can be used on transport vehicles or railroad cars other than flat cars if desired.

While one embodiment of my invention has been shown and described it will be apparent that other adaptations and modifications may be made without departing from the scope of the following claims.

I claim:

1. A lading cover adapted to be supported on spaced rails comprising side walls, end walls and a roof, roller means for supporting said cover for movement along said rails when said cover is supported on said rails, said side walls projecting a substantial distance above said rails, said roof including one portion fixed to one of said end walls and to said side walls and another portion hinged to said fixed portion, said hinged portion being adapted to be raised away from said side walls, the end wall opposite said one of said end walls being pivotally connected to the hinged portion of said roof, said hinged portion of said roof having at least one guide channel formed thereon normally disposed adjacent to and extending substantially parallel with the top of one of said side walls, counterbalance means attached to said one of said side walls, said counterbalance means including a lever pivotally mounted at a point intermediate its ends to said one of said side walls, the pivot point of said lever being disposed subjacent the hinged connection between the two portions of said roof, said lever normally extending in a substantially horizontal plane with one end thereof disposed in said guide channel and its other end extending away from said guide channel, a tension spring attached by one end to said other end of said lever and by its other end to said one of said side walls, said spring being effective to pivot said lever to raise said one end thereof thereby to apply counterbalancing force to said hinged roof portion when the same is raised away from said side walls.

2. A lading cover as defined by claim 1 including an adjustable link connected with and disposed between said other end of said lever and said one end of said spring whereby the tension of said spring relative to said lever can be varied.

References Cited in the file of this patent

UNITED STATES PATENTS

| | | |
|---|---|---|
| 619,029 | Wallace | Feb. 7, 1899 |
| 1,046,708 | Yount | Dec. 10, 1912 |
| 1,934,929 | Jonsson | Nov. 14, 1933 |
| 2,368,146 | Kooyman | Jan. 20, 1945 |
| 2,674,208 | Keller et al. | Apr. 6, 1954 |
| 2,817,304 | Newcomer et al. | Dec. 24, 1957 |
| 2,941,690 | Keys | June 21, 1960 |
| 2,949,867 | Ramsey | Aug. 23, 1960 |